United States Patent
Gerdeman et al.

(10) Patent No.: US 9,163,712 B2
(45) Date of Patent: Oct. 20, 2015

(54) TORQUE CONVERTER WITH CENTRIFUGAL PENDULUM ABSORBER

(71) Applicant: Schaeffler Technologies AG & Co. KG, Herzogenaurach (DE)

(72) Inventors: Daniel Gerdeman, Wooster, OH (US); Joshua David Harris, Copley, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 14/167,252

(22) Filed: Jan. 29, 2014

(65) Prior Publication Data

US 2014/0216879 A1    Aug. 7, 2014

Related U.S. Application Data

(60) Provisional application No. 61/762,124, filed on Feb. 7, 2013.

(51) Int. Cl.
*F16H 45/02* (2006.01)
*F16F 15/14* (2006.01)

(52) U.S. Cl.
CPC ............ *F16H 45/02* (2013.01); *F16F 15/145* (2013.01); *F16H 2045/0205* (2013.01); *F16H 2045/0226* (2013.01); *F16H 2045/0263* (2013.01); *F16H 2045/0278* (2013.01)

(58) Field of Classification Search
CPC .............................................. F16H 2045/0263
See application file for complete search history.

(56) References Cited

U.S. PATENT DOCUMENTS

| 6,126,568 | A | 10/2000 | Sudau |
| 7,267,211 | B2 | 9/2007 | Yamashita et al. |
| 8,161,740 | B2 | 4/2012 | Krause et al. |
| 8,839,924 | B2 * | 9/2014 | Takikawa et al. ............ 192/3.29 |
| 2011/0099992 | A1 * | 5/2011 | Magerkurth et al. ........... 60/435 |
| 2011/0240429 | A1 | 10/2011 | Heuler et al. |
| 2012/0080281 | A1 | 4/2012 | Takikawa et al. |
| 2012/0080282 | A1 * | 4/2012 | Takikawa et al. ............ 192/3.28 |
| 2012/0111683 | A1 * | 5/2012 | Ito et al. ....................... 192/3.28 |
| 2012/0180473 | A1 | 7/2012 | Huegel et al. |
| 2012/0325609 | A1 * | 12/2012 | Huegel ........................ 192/3.21 |

OTHER PUBLICATIONS

International Search Report and Opinion for PCT/US2014/013868, mailed May 7, 2014 by Korean Intellectual Property Office.

* cited by examiner

*Primary Examiner* — Rodney H Bonck
(74) *Attorney, Agent, or Firm* — Kathryn A. Warner; Kevin L. Parks

(57) ABSTRACT

A torque converter includes a cover, a piston plate, a first damper, a pendulum plate, and a drive plate. The cover forms at least a portion of a housing for the torque converter. The piston plate includes a friction surface for clutching engagement with the cover. The first damper includes a first elastic member and a first flange drivingly engaged with the first elastic member. The pendulum plate is axially disposed between the piston plate and the first flange and includes first slots arranged for supporting a pendulum mass. The drive plate includes a first portion fixed to the piston plate and an axial tab extending through the pendulum plate to engage the first flange.

18 Claims, 3 Drawing Sheets

TORQUE CONVERTER WITH CENTRIFUGAL PENDULUM ABSORBER

FIELD

The invention relates generally to a torque converter with a centrifugal pendulum absorber, and more specifically to a torque converter with a centrifugal pendulum absorber disposed axially between a piston plate and a damper.

BACKGROUND

Torque converters with centrifugal pendulum absorbers are known. One example is shown in commonly-assigned U.S. Pat. No. 8,161,740 to Krause et al.

BRIEF SUMMARY

Example aspects broadly comprise a torque converter including a cover, a piston plate, a first damper, a pendulum plate, and a drive plate. The cover forms at least a portion of a housing for the torque converter. The piston plate includes a friction surface for clutching engagement with the cover. The first damper includes a first elastic member and a first flange drivingly engaged with the first elastic member. The pendulum plate is axially disposed between the piston plate and the first flange and includes first slots arranged for supporting a pendulum mass. The drive plate includes a first portion fixed to the piston plate and an axial tab extending through the pendulum plate to engage the first flange.

In an example embodiment, the drive plate is fixed to the piston plate by riveting. In an example embodiment, the pendulum plate includes second slots disposed radially inside of the first slots, and the drive plate axial tab extends through the second slots. In some example embodiments, the torque converter includes a pendulum mass attached to the pendulum plate such that the pendulum mass can oscillate relative to the pendulum plate. The drive plate axial tab is disposed radially inside of the pendulum mass. In an example embodiment, the pendulum mass and the first elastic member are axially aligned.

In some example embodiments, the torque converter includes a second damper with a second elastic member, a second flange, and a first cover plate. The second flange is drivingly engaged with the second elastic member and arranged for driving engagement with a transmission input shaft. The first cover plate is drivingly engaged with the second elastic member and fixed to the pendulum plate. In an example embodiment, the first cover plate and the pendulum plate are fixed by riveting. In an example embodiment, the first damper is disposed radially outside of the second damper.

In some example embodiments, the torque converter includes a turbine shell and a second cover plate. The second cover plate is fixed to the first cover plate, drivingly engaged with the first and second elastic members, and fixed to the turbine shell. In an example embodiment, the second flange includes an axially extending circumferential surface and the second cover plate includes an axially extending circumferential surface circumscribing the second flange circumferential surface.

Other example aspects broadly comprise a damper for a torque converter including a piston plate, a first elastic damper, and a pendulum damper. The pendulum damper includes a pendulum mass axially disposed between the piston plate and the first elastic damper. In an example embodiment, the damper includes a connector plate disposed radially inside of the pendulum mass for connecting the piston plate to the first damper.

BRIEF DESCRIPTION OF THE DRAWINGS

The nature and mode of operation of the present invention will now be more fully described in the following detailed description taken with the accompanying drawing figures, in which.

DETAILED DESCRIPTION

At the outset, it should be appreciated that like drawing numbers appearing in different drawing views identify identical, or functionally similar, structural elements. Furthermore, it is understood that this invention is not limited only to the particular embodiments, methodology, materials and modifications described herein, and as such may, of course, vary. It is also understood that the terminology used herein is for the purpose of describing particular aspects only, and is not intended to limit the scope of the present invention, which is limited only by the appended claims.

Unless defined otherwise, all technical and scientific terms used herein have the same meaning as commonly understood to one of ordinary skill in the art to which this invention belongs. Although any methods, devices or materials similar or equivalent to those described herein can be used in the practice or testing of the invention, the following example methods, devices, and materials are now described.

Figure 1A:
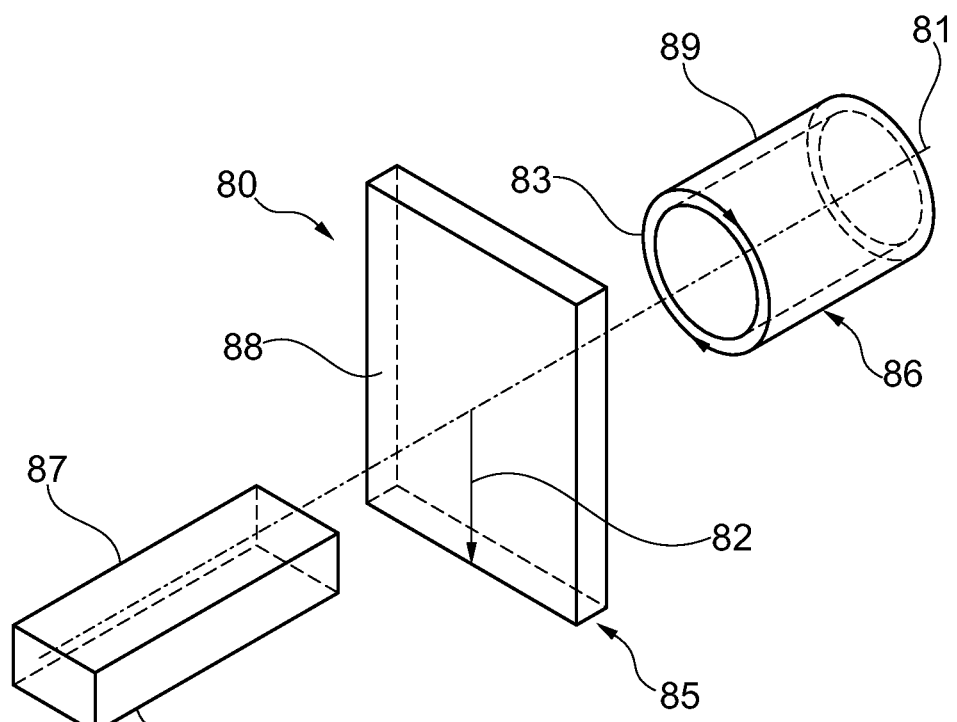
FIG. 1A is a perspective view of a cylindrical coordinate system demonstrating spatial terminology used in the present application.

FIG. 1A is a perspective view of cylindrical coordinate system 80 demonstrating spatial terminology used in the present application. The present invention is at least partially described within the context of a cylindrical coordinate system. System 80 has a longitudinal axis 81, used as the reference for the directional and spatial terms that follow. The adjectives "axial," "radial," and "circumferential" are with respect to an orientation parallel to axis 81, radius 82 (which is orthogonal to axis 81), and circumference 83, respectively. The adjectives "axial," "radial" and "circumferential" also are regarding orientation parallel to respective planes. To clarify the disposition of the various planes, objects 84, 85, and 86 are used. Surface 87 of object 84 forms an axial plane. That is, axis 81 forms a line along the surface. Surface 88 of object 85 forms a radial plane. That is, radius 82 forms a line along the surface. Surface 89 of object 86 forms a circumferential plane. That is, circumference 83 forms a line along the surface. As a further example, axial movement or disposition is parallel to axis 81, radial movement or disposition is parallel to radius 82, and circumferential movement or disposition is parallel to circumference 83. Rotation is with respect to axis 81.

The adverbs "axially," "radially," and "circumferentially" are with respect to an orientation parallel to axis 81, radius 82, or circumference 83, respectively. The adverbs "axially," "radially," and "circumferentially" also are regarding orientation parallel to respective planes.

Figure 1B:
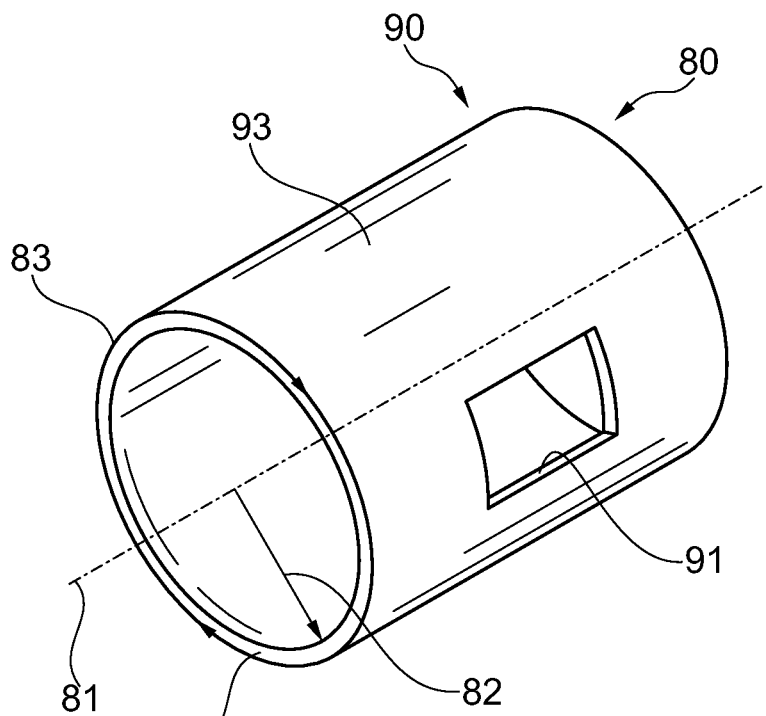
FIG. 1B is a perspective view of an object in the cylindrical coordinate system of FIG. 1A demonstrating spatial terminology used in the present application.

FIG. 1B is a perspective view of object 90 in cylindrical coordinate system 80 of FIG. 1A demonstrating spatial terminology used in the present application. Cylindrical object 90 is representative of a cylindrical object in a cylindrical coordinate system and is not intended to limit the present invention in any manner. Object 90 includes axial surface 91, radial surface 92, and circumferential surface 93. Surface 91 is part of an axial plane, surface 92 is part of a radial plane, and surface 93 is part of a circumferential plane.

Figure 2:
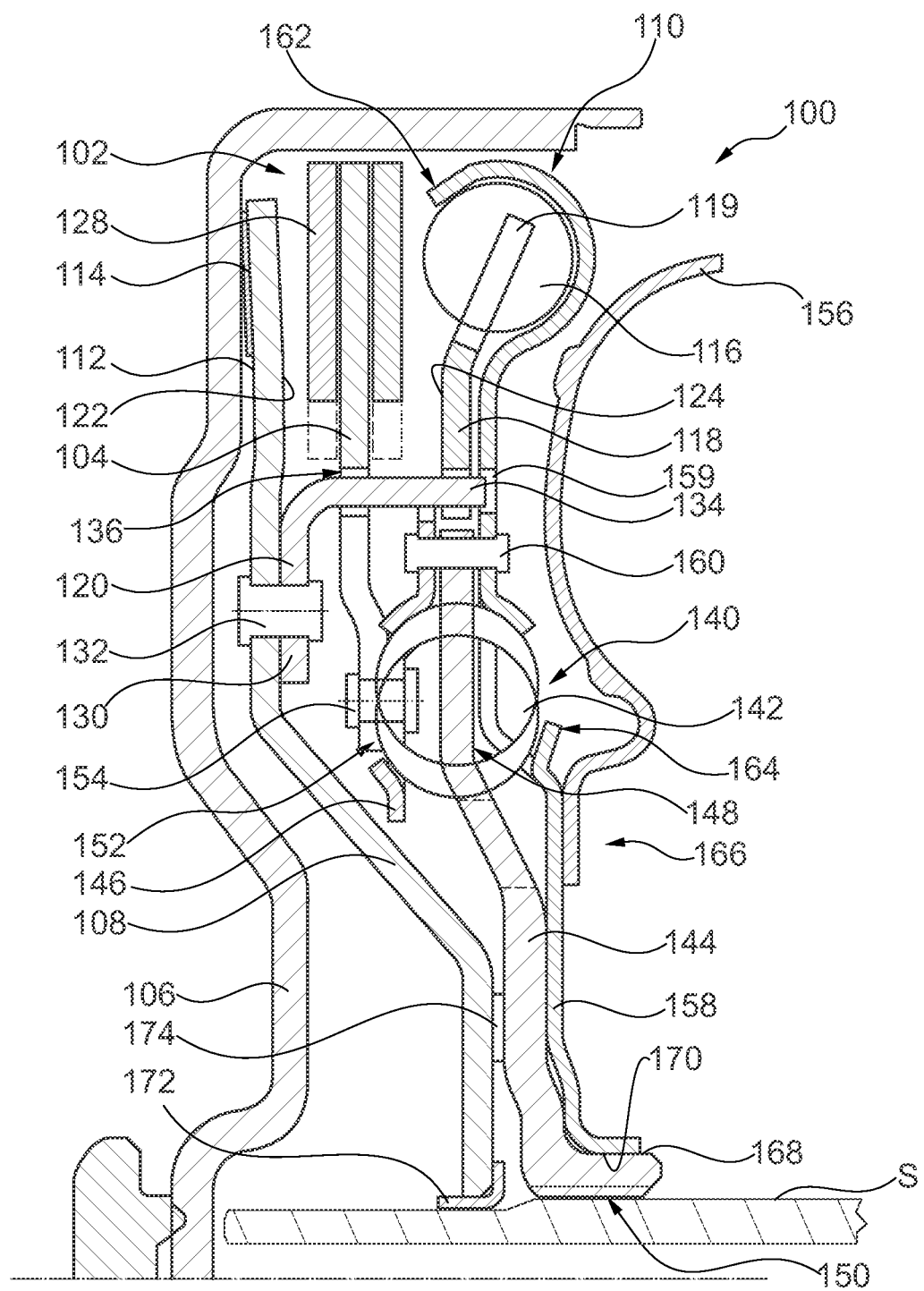
FIG. 2 is a cross-section view of a portion of a torque converter with a centrifugal pendulum absorber according to an example aspect; and, FIG. 3 is a front view of a pendulum plate.
Figure 3:
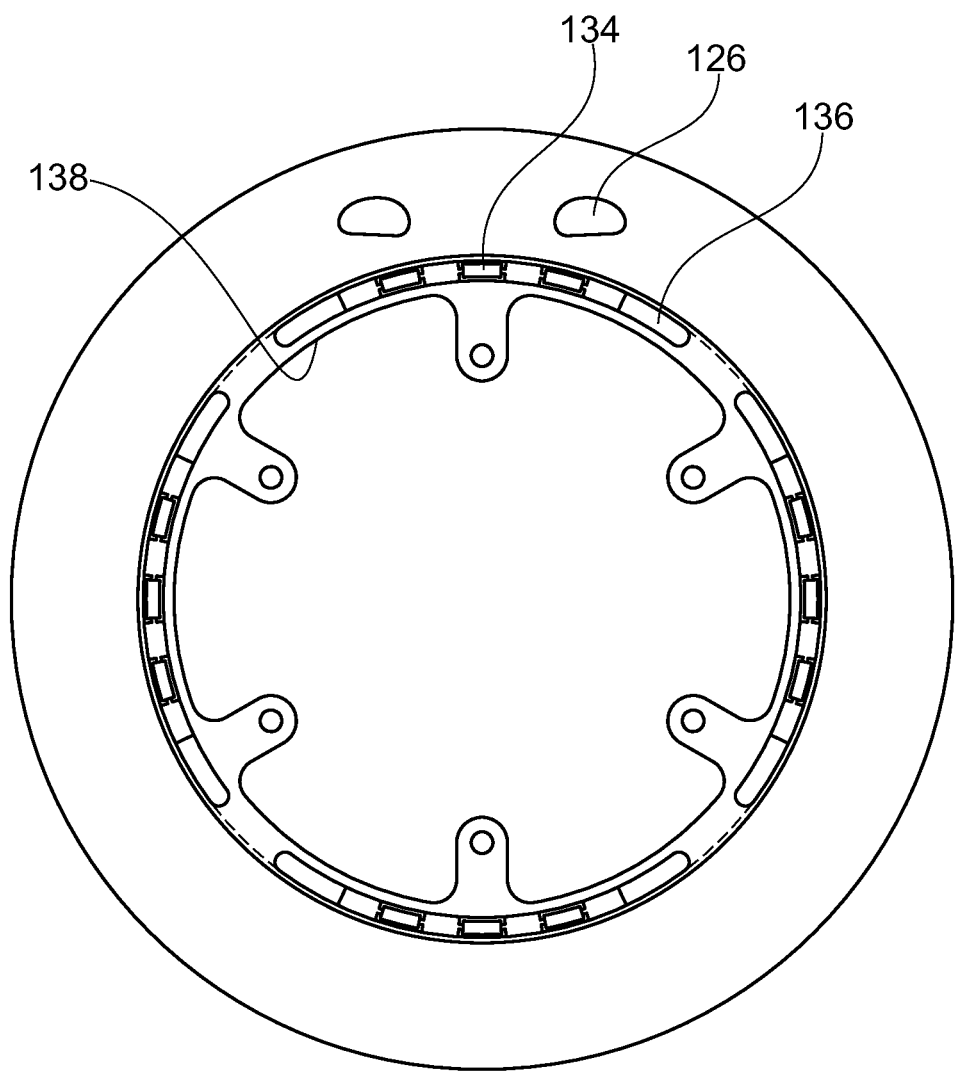

The following description is made with reference to FIGS. 2-3. FIG. 2 is a cross-section view of a portion of torque converter 100 with centrifugal pendulum absorber 102 according to an example aspect. FIG. 3 is a front view of pendulum plate 104. Torque converter 100 includes cover 106, piston plate 108 and damper 110. Cover 106 may include lugs or studs arranged for connection with an engine (not shown). Cover 106 forms at least a portion of a housing for the torque converter. Piston plate 108 includes friction surface 112 with friction material ring 114 for clutching engagement with the cover. That is, the piston plate is arranged to frictionally engage the cover when acted upon by an apply pressure as is commonly known in the art.

Damper 110 includes elastic member 116 and flange 118. Elastic member 116 may be a coil spring, for example. Flange 118 is drivingly engaged with the elastic member at tab 119, for example. Torque converter 100 also includes pendulum plate 104 and drive plate 120. The pendulum plate is axially disposed between the piston plate and the flange. That is, piston plate 108 includes radial wall 122, opposite friction surface 112, and flange 118 includes radial wall 124, and at least a portion of the pendulum plate is located between the radial walls. It should be noted that, although both walls are substantially radial, the walls could have other shapes. For example, flange 118 may have a curved, ring-shaped, or conical wall. Pendulum plate 104 includes slots 126 arranged for supporting pendulum mass 128. Pendulum mass 128 is arranged to oscillate relative to the pendulum plate as shown and described in commonly-assigned U.S. Pat. No. 8,161,740, hereby incorporated by reference as if set forth fully herein.

Drive plate 120 includes portion 130 fixed to piston plate 108 by rivet 132, for example, and axial tab 134 extending through the pendulum plate to engage the flange. Although portion 130 is shown as a radial wall, other shapes of portion 130 are possible. For example, portion 130 may be curved, ring-shaped, or conical. In an example embodiment, pendulum plate 104 includes slots 136 disposed radially inside of slots 126, and drive plate axial tab 134 extends through slots 136. In an alternative embodiment (not shown), pendulum plate 104 inner circumferential surface 138 may have a larger inside diameter and the tabs can extend radially inside of the inner circumferential surface. Tab 134 is disposed radially inside of pendulum mass 128.

Torque converter 100 also includes second damper 140 including elastic member 142, flange 144, and cover plate 146. Elastic member 142 may be a coil spring, for example. Flange 144 is drivingly engaged with elastic member 142 at window area 148, and arranged for driving engagement with transmission input shaft S at hub spline 150. By window area, we mean a cutout in the plate where the spring is inserted such that the circumferential ends of the spring contact the edge walls of the cutout. Cover plate 146 is drivingly engaged with elastic member 142 at window area 152, and fixed to pendulum plate 104 by rivet 154. Damper 110 is disposed radially outside of damper 140.

Torque converter 100 includes turbine shell 156 and cover plate 158 with optional clearance slot 159 for permitting relative rotation of drive plate 120 relative to the cover plate. Turbine shell 156 forms a portion of a fluid circuit generally including a turbine, stator, and impeller (not shown) as is commonly known in the art. Cover plate 158 is fixed to cover plate 146 at rivet 160, for example, and drivingly engaged with elastic members 116 and 142. That is, cover plate 158 includes a spring retainer portion 162 engaged with spring 116 and a window area 164, similar to window area 152 of cover plate 146, engaged with spring 142. By retainer portion, we mean an arcuately shaped portion of the cover plate for receiving the spring and including indented portions at opposite circumferential ends of the spring to prevent the spring from rotating past the indented portions when acted upon by the flange. Torque from flange tab 119 passed to spring 116 is received by the cover plate indent portions (not shown). Cover plate 158 is fixed to the turbine shell at area 166 by welding or riveting, for example.

In an example embodiment, flange 144 includes axially extending circumferential surface 168 and cover plate 158 includes axially extending circumferential surface 170 circumscribing surface 168 such that the cover plate and turbine shell are radially centered through the flange spline to input shaft S. Piston plate 108 includes bushing 172 for centering and sealing relative to the input shaft. Thrust ring 174 disposed axially between the piston plate and flange prevents metal-on-metal contact when the flange is urged towards the piston plate by the turbine shell and cover plate 158. Thrust ring 174 may be a paper-based, low friction material bonded to one of the piston plate or flange, for example.

A torque path for the torque converter in a lockup mode may be described as follows. When lockup is commanded, the piston plate is pressed against the cover so that engine torque received by the cover is transmitted by the piston plate. Piston plate torque passes through the drive plate to flange 118. Flange 118 transmits torque to cover plate 158 through spring 116. Cover plate 158 is connected to cover plate 146, turbine shell 156 and pendulum plate 104. Pendulum mass 128 is tuned to oscillate and reduce vibration of the cover plates and turbine shell. The damped torque is passed to output flange 144 though spring 142 and exits the torque converter through input shaft S.

Configuration of converter 100 is advantageous due to the positioning of the damper components. Moving both the pendulum masses and the outer damper radially outward improves performance by increasing the effective inertia of the pendulums and lowering the spring rate of the damper. Furthermore, the configuration of drive plate 120 allows a desirable positioning of the outer damper in a small pocket formed between the arcuate shape of the turbine shell and the axial rim of the torque converter cover. This reduces axial space required by the damper. This is especially important in front wheel drive vehicles because axial space is limited by the width of the vehicle.

Of course, changes and modifications to the above examples of the invention should be readily apparent to those having ordinary skill in the art, without departing from the spirit or scope of the invention as claimed. Although the invention is described by reference to specific preferred and/or example embodiments, it is clear that variations can be made without departing from the scope or spirit of the invention as claimed.

We claim:

1. A torque converter comprising:
    a cover forming at least a portion of a housing for the torque converter;
    a piston plate including a friction surface for clutching engagement with the cover;

a first damper including a first elastic member and a first flange drivingly engaged with the first elastic member;

a pendulum plate axially disposed between the piston plate and the first flange, and including first slots arranged for supporting a pendulum mass and second slots disposed radially inward of the first slots; and, a drive plate including a first annular portion fixed to the piston plate and an axial tab portion extending through the pendulum plate second slots to slidingly engage the first flange.

2. The torque converter of claim 1 wherein the drive plate first annular portion includes an aperture for receiving a rivet and wherein the drive plate is directly fixed to the piston plate by riveting.

3. The torque converter of claim 1 wherein the pendulum mass is attached to the pendulum plate such that the pendulum mass can oscillate relative to the pendulum plate, wherein the drive plate axial tab is disposed radially inward of the pendulum mass.

4. The torque converter of claim 3 wherein the pendulum mass and the first elastic member are axially aligned.

5. The torque converter of claim 1 further comprising:
a second damper including:
  a second elastic member;
  a second flange drivingly engaged with the second elastic member and arranged for driving engagement with a transmission input shaft; and,
  a first cover plate drivingly engaged with the second elastic member and fixed to the pendulum plate.

6. The torque converter of claim 5 wherein the first cover plate and the pendulum plate are fixed by riveting.

7. The torque converter of claim 5 wherein the first damper is disposed radially outward of the second damper.

8. The torque converter of claim 5 further comprising:
a turbine shell, and;
a second cover plate:
  fixed to the first cover plate;
  drivingly engaged with the first and second elastic members; and,
  fixed to the turbine shell.

9. The torque converter of claim 8 wherein:
the second flange includes a first axially extending circumferential surface; and,
the second cover plate includes a second axially extending circumferential surface circumscribing the first axially extending circumferential surface.

10. A damper for a torque converter comprising:
a piston plate;
a first elastic damper;
a pendulum damper including:
  a pendulum mass axially disposed between the piston plate and the first elastic damper; and,
  a pendulum plate axially disposed between the piston plate and the first elastic damper and including first slots arranged for supporting the pendulum mass and second slots disposed radially inward of the first slots; and a connector plate disposed radially inward of the pendulum mass for connecting the piston plate to the first damper; wherein the connector plate includes an axial tab portion extending through the pendulum plate second slots and an aperture for receiving a rivet and the connector plate is directly riveted to the piston plate.

11. A torque converter comprising:
a cover forming at least a portion of a housing for the torque converter;
a piston plate arranged for sealing relative to a transmission input shaft;
a first damper including:
  a first elastic member; and,
  a first flange drivingly engaged with the first elastic member;
a pendulum plate axially disposed between the piston plate and the first flange, and including first slots arranged for supporting a pendulum mass and second slots disposed radially inward of the first slots; and,
a drive plate including:
  a first annular portion fixed directly to the piston plate; and,
  an axial tab portion extending through the pendulum plate second slots to slidingly engage the first flange.

12. The torque converter of claim 11 wherein the piston plate is rotatable independent of the cover.

13. The torque converter of claim 11 further comprising a bushing for sealing the piston plate to the transmission input shaft.

14. The torque converter of claim 11 wherein the piston plate includes a friction surface for clutching engagement with the cover.

15. The torque converter of claim 11 further comprising:
a second damper including:
  a second elastic member;
  a second flange drivingly engaged with the second elastic member and arranged for driving engagement with the transmission input shaft; and,
  a first cover plate drivingly engaged with the second elastic member and fixed to the pendulum plate.

16. The torque converter of claim 15 wherein the first cover plate and the pendulum plate are fixed by riveting.

17. The torque converter of claim 15 wherein the first damper is disposed radially outward of the second damper.

18. The torque converter of claim 15 further comprising:
a turbine shell, and;
a second cover plate:
  fixed to the first cover plate;
  drivingly engaged with the first and second elastic members; and,
  fixed to the turbine shell.

\* \* \* \* \*